UNITED STATES PATENT OFFICE.

CARL DANIEL EKMAN, OF BERGVIK, SWEDEN, GEORGE FRY, OF LONDON, ENGLAND, AND W. BANCROFT ESPEUT, OF JAMAICA, WEST INDIES.

EXTRACTION OF SACCHARINE MATTER FROM VEGETABLE SUBSTANCES.

SPECIFICATION forming part of Letters Patent No. 286,187, dated October 9, 1883.

Application filed August 3, 1883. (No specimens.) Patented in England December 23, 1882, No. 6,149; in France February 16, 1883, No. 141,440, and in Belgium February 17, 1883, No. 44,071.

*To all whom it may concern:*

Be it known that we, CARL DANIEL EKMAN, a citizen of Sweden, GEORGE FRY and WILLIAM BANCROFT ESPEUT, citizens of Great Britain, residing, respectively, at Bergvik, Sweden, at 57½ Old Broad Street, in the city of London, England, and at Jamaica, in the West Indies, have invented certain new and useful Improvements in the Extraction of Saccharine Matter from Vegetable Substances, (for which we have received Letters Patent in England, No. 6,149, dated December 23, 1882;) and we do hereby declare that the following is a full, clear, and exact description of the invention, which will enable others skilled in the art to which it appertains to make and use the same.

The object of this invention is the extraction from sugar-cane and from other vegetable substances containing saccharine matter of a larger percentage of sugar than is obtained by the method commonly practiced, accompanied by less than the usual amounts of impurity.

A method of carrying into effect this invention, when applied to fresh sugar-canes, is as follows: The canes (prepared in the usual way for manufacture) are cut into such pieces that they may be properly penetrated by the liquid in the boiling operation, hereinafter to be described; or they may be crushed, broken, or otherwise mechanically treated to effect the same object. In this state they are placed in a boiler or vessel constructed of or lined with lead or other metal or substance capable of resisting the action of the boiling solution and of the chemicals employed. This vessel or boiler must be so constructed as to be capable of being heated in a gradual and suitable manner, (such as, for example, by means of a steam-jacket,) of sufficient strength to resist the pressure required for the operation, and of a form convenient for filling and discharging. The canes (prepared as described) are placed in this vessel or boiler, (with as little delay and exposure to the atmosphere as possible,) and it is filled with them to such an extent that they may be covered by the boiling liquid, and yet that a steam-space may be left. The boiling liquid (of a composition hereinafter described) is then run in so as to cover the canes. The boiler or vessel is then made tight in the usual way, and the temperature is gradually raised until the pressure exceeds that of the atmosphere. The pressure during and the duration of the boiling operation must depend much upon the character and nature of the canes or other vegetable substances treated, and other considerations hereinafter referred to.

The solution employed in the boiling operation consists of water containing sulphurous acid and magnesia, soda, potash, or other suitable base.

When the object has been to extract crystallizable sugar, good results have been obtained by using one equivalent of sulphurous acid and one equivalent of magnesia and boiling at a pressure of about fifteen pounds to the square inch; but when the quality of the sugar is not so material, solutions containing a relatively larger proportion of sulphurous acid and pressure exceeding that above named may be used. Acid sulphites and high temperatures, however, have a tendency to invert and to destroy the sugar.

A solution containing more base than the quantity sufficient to form one equivalent to the sulphurous acid may in some cases be used with success; but, as a rule, the proportions which form the normal sulphite are preferred. The strength of the solution which has been used with success is one containing about one-half to one per cent. of the weight of the canes of normal sulphite of magnesia; but it will be understood that the invention is not confined to this proportion.

Beet-roots may be treated in a similar manner to that above described for sugar-canes.

In treating a raw material regard must be had to its character and condition. If a substance is hard and compact, it will require higher pressure to effect the same amount of disintegration, and consequent perfect extraction of its saccharine constituents, in a given time, and given the same chemicals and pressure, the duration of the boiling will have an effect in obtaining more complete extraction; but, on the other hand, it must be borne in mind that high temperatures and solutions and long boiling have, both separately and jointly, a tendency to invert and (carried to extremes) to destroy sugar. In operating, therefore, some judgment must be exercised in order to obtain the best results.

After the completion of the boiling process the liquid may be separated from the solid or pulpy matter by mechanical or other means. The liquid will be found to contain (if the operation has been properly performed) a very large proportion of the saccharine matter contained in the raw material, and it may be treated in any suitable manner to obtain the sugar in a crystallized form; or, if the operation has been so performed that the sugar is more or less inverted, it may be utilized by fermentation and distillation, or by other suitable means.

We claim—

The extraction of sugar from vegetable substances by boiling under pressure with a solution containing sulphurous acid and a base or alkali.

CARL DANIEL EKMAN.
   GEO. FRY.
   W. BANCROFT ESPEUT.

Witnesses to the signatures of Carl Daniel Ekman and George Fry:
 WILLIAM SPENCE,
 ALFRED H. JONES.

Witnesses to the signature of W. Bancroft Espeut:
 GEO. E. HOSKINSON,
 S. J. MURPHY.